Sept. 26, 1933. C. B. STEWART 1,928,117
NET PULLING MACHINE
Filed May 22, 1933
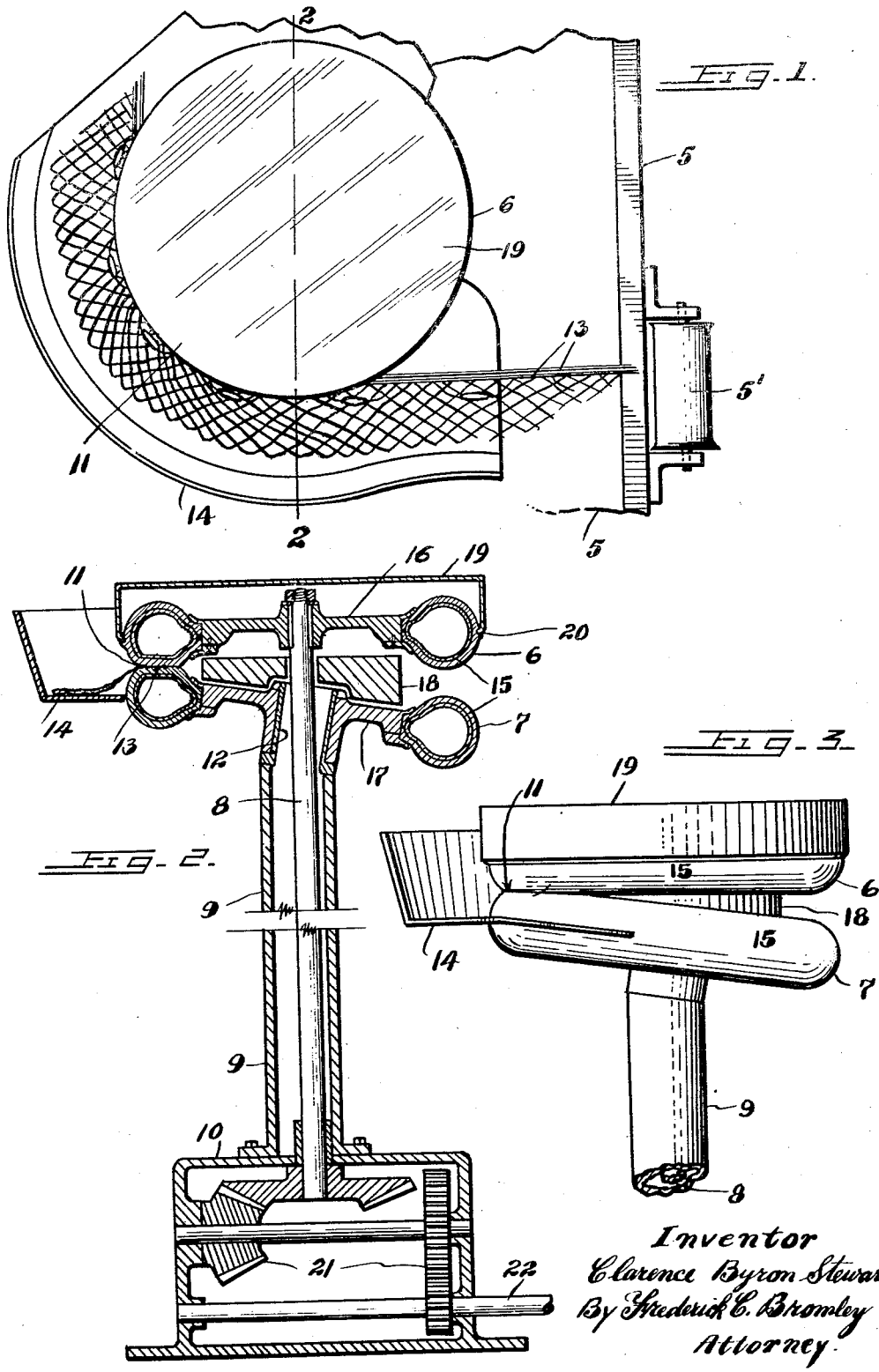
Inventor
Clarence Byron Stewart
By Frederick C. Bromley
Attorney Patented Sept. 26, 1933

1,928,117

UNITED STATES PATENT OFFICE 1,928,117

NET PULLING MACHINE

Clarence Byron Stewart, Port Dover, Ontario, Canada

Application May 22, 1933. Serial No. 672,270

5 Claims. (Cl. 254—138)

The invention relates to improvements in net pulling machines as described in the present specification and shown in the accompanying drawing that forms part of the same.

The aim of the present invention is to produce a highly efficient machine for hauling in nets of a fishing craft. More particularly the invention aims to reduce wear and tear of the nets in the operation of hauling them in and to preclude injury to the corks and leads as the side lines are pulled by the gripping elements of the machine.

The invention consists essentially in the construction and arrangement of a machine in which the side lines of the nets are grasped and pulled between coacting rotary members having resilient engaging faces for precluding injury to the nets. The gripping faces are composed of bands or annuli of yieldable nature such as rubber. As a matter of fact best results have been attained by utilizing pneumatic bands or tires on rigid wheels, one or both of which are driven from a suitable source of power. The wheels are mounted on substantially concentric axes in juxtaposition to each other but at a slight angle so as to throw a part of the bands or tires in tangential contact to compose the yieldable gripping elements, the remainder of the wheels relatively diverging. By making a partial contact only between the wheels there is a breach on each side of the circumferential contacting area, one of which sides enables the nets to feed in whilst the other allows of its discharge after being pulled through the arc of contact.

Referring to the accompanying drawing, Figure 1 illustrates a net in the machine and shows the usual roller at the side of the fishing craft over which the net runs. This view is shown in plan.

Figure 2 is a vertical sectional view taken on the line 2—2 of Figure 1.

Figure 3 is an elevation of the rotary members and the pan for the net.

In the accompanying drawing, the hull of a fishing craft is denoted at 5 which is supplied with the customary roller 5' at one side thereof over which the nets are drawn in hauling them in. The roller has a conventional mounting and does not form a part of the instant invention. The net pulling machine is situated in the vicinity of the roller and comprises a pair of rotary members 6 and 7, the upper one of which is disposed in a horizontal plane and affixed to a vertical shaft and suitably journalled within a hollow standard 9 rising from the base 10.

The lower rotary member is situated at an angle to its companion and has circumferential contact at one point at 11, which forms the gripping element. This lower rotary member is journalled on a sleeve 12 rigidy mounted in suitable manner on the standard 9. Due to the cant of this rotary member it has tangential contact with its companion and therefore only a part of the circumference of each member grips the net. The side lines 13 of the net are tangentially led into the gripping zone of the rotary members and pass therearound through the area of contact 11 and are released by the parting of the members. The net is fed to the usual receptacle as it leaves the machine and during the pulling operation the pan 14 suppports the net as it passes around the rotary members.

In the preferred construction of the invention both rotary members are equipped with resilient bands or tires 15 between which the side lines are gripped. These bands or tires are constructed of rubber annuli inflated with air to impart resiliency to them. The tires are mounted on rigid wheels 16 and 17 and the manner of their mounting may be conventional or otherwise. The wheel 16 belongs to the upper rotary member 6 and is keyed to the shaft 8, whereas the wheel 17 is journalled on the sleeve 12 so as to freely turn on it.

Between the wheels it is proposed to employ a circular guard 18 in order to prevent the side lines or any other part of the nets from becoming caught in the wheels or mechanism thereof.

It is proposed to cover the upper surface of the top rotary member with a face plate 19 which may be applied by fitting an inturned edge in a groove in the tire as at 20.

The shaft 8 may be driven in suitable manner and by way of illustration it is shown as driven by reduction gearing 21 from a power take off shaft 22.

According to this invention it will be manifest that to haul nets in it is merely necessary to set the rotary members in operation and feed the side lines to them, which members grip the side lines and pull them through the gripping area, thus gradually hauling them in.

It will be manifest that due to the resilient gripping elements no injury results to the nets.

It will be apparent that various changes and modifications may be resorted to as coming within the spirit and scope of the appended claims, such as for example in equipping one of the rotary members with a pneumatic gripping band and the other with a non-resilient gripping band.

What I claim is:—

1. In a net pulling machine, a pair of rotary members having tangential contact over part of their circumference, said rotary members presenting a resilient zone of contact under pressure constituting a gripping element for pulling upon a net, said gripping element embracing a pneumatic tire, and means for rotating said members.

2. In a net pulling machine, a pair of rotary members disposed side by side in divergent planes, pneumatic tires thereon in arc contact with each other to present a gripping element, and means for rotating said members.

3. In a net pulling machine, a pair of rotary members disposed side by side in divergent planes, pneumatic tires thereon in arc contact with each other to present a gripping element for a net, a hollow standard, a sleeve affixed thereto and rotatably supporting one of said rotary members, a shaft extending through said standard and affixed to the other rotary member, and means for driving said shaft.

4. In a net pulling machine, a pair of rotary members disposed side by side in divergent planes, pneumatic tires thereon in arc contact with each other to present a gripping element for a net, a guard disposed between the rotary members, a pan partly surrounding the members to support the net as it is pulled around them, and means for rotating said members.

5. In a net pulling machine, a pair of rotary members disposed side by side in divergent planes, pneumatic tires thereon in arc contact with each other to present a gripping element for a net, a face-plate presenting a cover for one of said rotary members and having an inturned edge fitted in a groove in the tire thereof, and means for rotating said members.

CLARENCE BYRON STEWART.